United States Patent [19]

Blocquel

[11] Patent Number: 5,263,059
[45] Date of Patent: Nov. 16, 1993

[54] PROCESS AND DEVICE FOR THE POSITIONING OF A TOOL IN RELATION TO THE AXIS OF A TUBE, ESPECIALLY FOR A STEAM GENERATOR OF A NUCLEAR REACTOR

[75] Inventor: Alain Blocquel, Dardilly, France

[73] Assignee: Framatome, Paris la Defense, France

[21] Appl. No.: 985,033

[22] Filed: Dec. 3, 1992

[30] Foreign Application Priority Data

Dec. 3, 1991 [FR] France .................... 91 14975

[51] Int. Cl.⁵ .......................................... G21C 17/00
[52] U.S. Cl. ................................. 376/258; 376/248; 376/262
[58] Field of Search ................ 376/262, 248, 260, 258

[56] References Cited

U.S. PATENT DOCUMENTS

| | | | |
|---|---|---|---|
| 4,575,185 | 3/1986 | Wentzell et al. | 376/260 |
| 4,729,423 | 3/1988 | Martin | 376/248 |
| 4,795,606 | 1/1989 | Fenemore et al. | 376/248 |
| 5,089,684 | 2/1992 | Griffaton | 376/260 |
| 5,091,141 | 2/1992 | Feuillet | 376/260 |

OTHER PUBLICATIONS

"Applied Optics"-p. 2837,-vol. 28, No. 14-Jul. 15, 1989.

Primary Examiner—Donald P. Walsh
Assistant Examiner—Frederick H. Voss
Attorney, Agent, or Firm—Pollock, Vande Sande & Priddy

[57] ABSTRACT

Process and device for the positioning of a tool (10) carried by a manipulating arm displaceable in three respectively perpendicular directions of space in relation to the vertical axis of a tube carried by the tube plate of a steam generator for a nuclear reactor. The process involves arranging symmetrically on the arm a set of at least three lighting sources (17) each supplying a light beam directed tangentially towards the periphery of a tube (5), retransmitting, via an optical assembly (18) also carried by the arm, the images of three specific points of the tube illuminated by the sources in the direction of a video monitor, the screen (21) of which comprises three reticles (42, 43, 44) delimiting the actual contour of the tube, and then bringing these images into coincidence with the reticles in order to center the axis (28) of the tools strictly on the axis (35) of the tube.

9 Claims, 3 Drawing Sheets

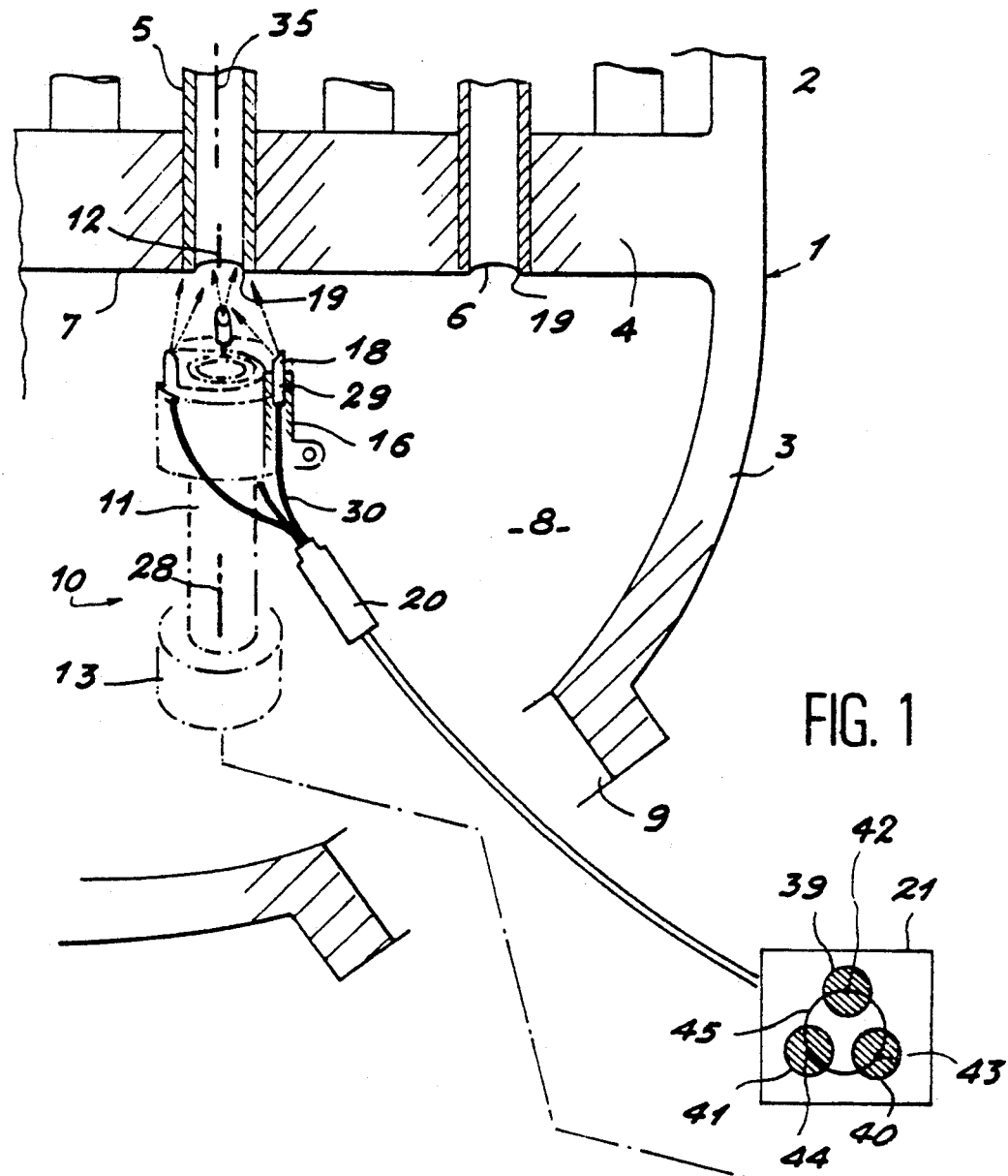
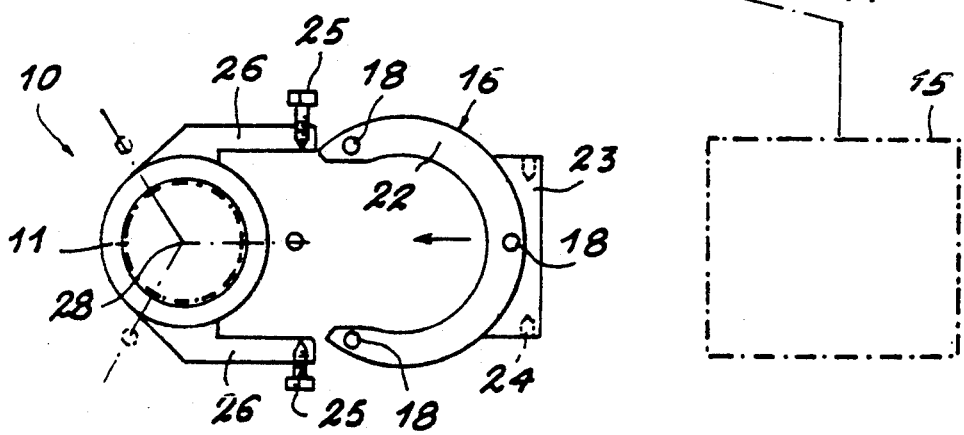
FIG. 1
FIG. 2

PROCESS AND DEVICE FOR THE POSITIONING OF A TOOL IN RELATION TO THE AXIS OF A TUBE, ESPECIALLY FOR A STEAM GENERATOR OF A NUCLEAR REACTOR

FIELD OF THE INVENTION

The present invention relates to a process for ensuring the remote positioning of a tool in relation to a specific reference and more particularly of a work appliance in relation to a tube of a steam generator of the type of those used in nuclear power stations for the generation of electricity. The invention is also concerned with a device for carrying out this process.

BACKGROUND OF THE INVENTION

The use of a work tool on such steam generators, conventionally comprising, within a closed containment, at least one transverse plate, called a tube plate, which separates this containment and from which extends a plurality of parallel tubes which pass through the plate and through which flows a pressurized fluid exchanging heat by way of their wall, demands rapid, accurate and reliable positioning of the tool in relation to the axis of each tube on which work is to be carried out, from a region located on one side of the tube plate which is located within the containment and into which this tool is introduced.

In view of the conditions prevailing in the containment and particularly because of the presence of radioactive radiation, it is obvious that this positioning of the tool in relation to any of the tubes to be treated has to be carried out at a distance and by remote control, the tool being loaded on or fastened to a remote manipulator arm making it possible to displace it in the three spacial directions, especially to reset it in relation to a given reference direction which is usually formed by the axis of the tube in question. Moreover, to prevent any risk of damage to the tubes or to the tool, it is virtually indispensable that the centering of one tube in relation to another should take place without any physical contact between them.

There are already known devices of this type suitable for executing the centering of such a tool in relation to the generally vertical axis of a tube belonging particularly to a steam generator, these devices employing mechanical feelers which, precisely, necessitate direct contact between the tool and the tube plate, with the disadvantages already mentioned, which the subject of the invention proposes to avoid.

Moreover, other solutions have been considered, such as particularly in FR-A-2,628,671, which illustrates a remote-manipulation assembly ensuring the desired centering, controlled at a distance and without any physical contact between the tool and the tube. In principle, the device described in this prior patent comprises a rail-shaped radial support capable of pivoting about the center of the tube plate and extending under and parallel to this plate. A carriage designed to slide along the length of this arm comprises an axle on which a photographic camera is mounted and a second axle carrying the working and monitoring tool. The camera objective, which is directed towards the tube plate, and the axis of which is thus parallel to that of the tubes, determines the contour at the end of this tube as a result of the contrast generated by activating means for illuminating the inner zone of the tube viewed by the camera. Computation and control means connected to the camera are then operated in order to locate exactly the position of the axis of this tube, with which the axis of the camera is brought into close coincidence as a result of a suitable displacement of the carriage. Once this operation has been carried out, the carriage is displaced once again in order to center the tool in the axis of the tube by means of a second translational movement, which thereby substitutes the tool for the camera, making it possible to work inside the tube with a perfect positioning in relation to the latter.

The disadvantage of such a device is that it is necessary to employ means which are generally complex to control and normally costly, these means comprising particularly a computer and carriage-position monitoring sensors, the indications of which are managed by this computer. Furthermore, since the sight axis of the camera is different from that of the tool, a translational movement is necessary each time in order to substitute one for the other, thus adversely affecting the final accuracy of the centering obtained.

SUMMARY OF THE INVENTION

The subject of the present invention is a process and a device of simple design and of high accuracy for centering a tool, mounted on a manipulating arm or a similar remote-controlled carrier structure, in relation to the axis of a tube flush with the surface of a tube plate for a steam generator of a nuclear reactor, this centering being carried out directly by means of the carrier arm of the tool, brought substantially into the axis of the tube which is to be treated and in relation to which the work tool is to be resecured accurately and quickly.

To this end, the process in question, for the positioning of a tool carried by a manipulating arm or similar support, capable of being displaced in three respectively perpendicular directions of space in relation to a reference axis, especially the vertical axis of a tube carried by a plate, called a tube plate, of a steam generator for a nuclear reactor, involves arranging symmetrically on this arm a set of at least three lighting sources, each providing a light beam directed tangentially towards the periphery of a tube, retransmitting, by means of an optical assembly likewise carried by the arm, the images of three specific points of the tube illuminated by the sources in the direction of a video monitor, the screen of which comprises three reticles delimiting the actual contour of this tube, and then bringing these images into coincidence with the reticles in order to center the axis of the tool strictly on the axis of the tube.

Preferably, the three lighting sources consist of point lamps, especially of the halogen-lamp type, of which the light beams which they supply, after being reflected on the end of the tube, are received by three independent optical systems returning the images of the three points of the tube illuminated by the sources towards a common camera connected to the video monitor. Likewise preferably, each source is associated with an optical system located in the vicinity, the three sources and the three optical systems being respectively distributed substantially at 120° about the axis of the work tool.

The invention also relates to a device for carrying out this process, comprising a horseshoe-shaped supporting frame surrounding partially and without direct contact the body of a work tool, the spindle of which is intended to be placed coaxially with the axis of a tube, this frame comprising at least three lighting sources arranged substantially at 120° about the spindle and three optical systems, each source supplying a narrow light beam directed tangentially onto the periphery of the tube in its end flush with the face of the tube plate, in order to provide an image of a point of the latter collected by the optical system associated with each source, the images of the three points being retransmitted to the screen of a video monitor comprising three reticles delimiting the actual contour of the tube, and means for displacing the tool in relation to the tube in order to bring these images into coincidence with the reticles so as to center the axis of the tool on the axis of the tube.

Preferably, each optical system consists of an optical fiber, the three systems corresponding to the three lighting sources likewise being distributed substantially at 120° about the axis of the tool and being carried by the supporting frame in the immediate vicinity of each source. Likewise preferably, the three sources consist of halogen point lamps.

The images of the three points of the tube, collected separately by the three fibers, are advantageously returned to a single solid-state sensor, particularly of the charge-transfer type, connected to a common camera transmitting these images simultaneously to the screen of the video monitor comprising the three positioning reticles.

According to another characteristic, the supporting frame comprises a bracket for fastening to the body of the work tool by means of adjusting screws or the like, making it possible to bring the center of the horseshoe frame into coincidence with the axis of the tool.

According to another characteristic, the end face of each optical system is arranged in such a way that the perpendicular to the latter delimits a specific angle with the direction of the axis of the tube, the narrow light beam supplied by the associated source having a given aperture angle centered on this perpendicular, in such a way that this beam, made tangent to the periphery of the tube, provides an image representing a fraction of the inner part of this tube and simultaneously a fraction of the part outside this tube in the tube plate.

BRIEF DESCRIPTION OF THE DRAWINGS

Other characteristics of the process for the remote positioning of a tool in relation to the axis of a tube of a steam generator for a nuclear reactor and of the device for carrying out this process will emerge from the following description of an exemplary embodiment given with reference to the accompanying drawings.

FIG. 1 is a partially sectional schematic perspective view of a tube plate of a steam generator and of a work tool on any tube of this plate, comprising automatic centering means designed according to the invention.

FIGS. 2 and 3 show on two different scales the supporting frame and the means which it comprises, which are intended to be mounted on the body of the tool in order to allow centering of the latter in relation to the axis of the selected tube.

DESCRIPTION OF PREFERRED EMBODIMENT

Figure 3:
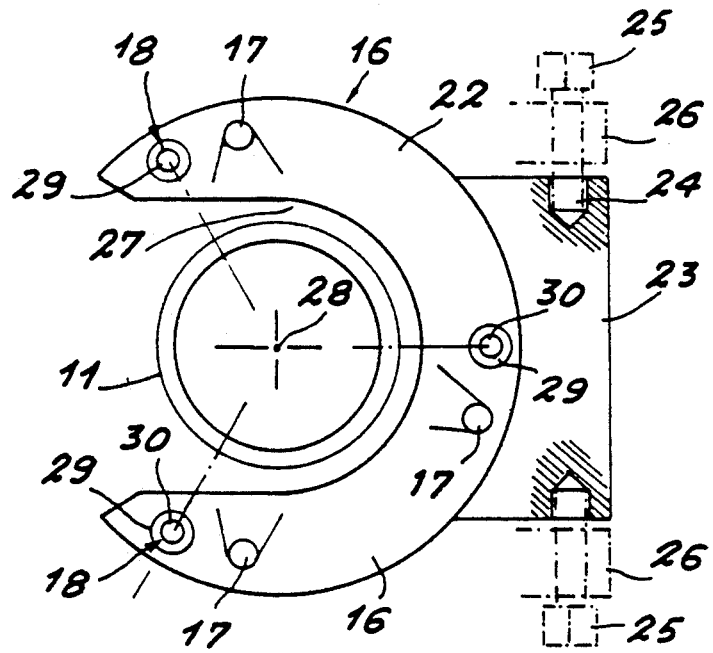

FIG. 1 shows the containment 1 of a steam generator for a nuclear reactor, this generator comprising an outer casing 2, the lower bottom 3 of which takes the form particularly of a spherical dome which is connected to the casing 2 in line with a transverse plate 4, called a tube plate, the latter being associated with a plurality of tubes 5 passing through the plate 4, while being suitably immobilized in relation to the latter. Preferably, the tubes 5 are fixed to the plate 4, being expanded in relation to it so as to make their connection leakproof, these tubes 5 opening at their lower end 6 onto the corresponding surface 7 of the plate 4.

In the conventional way, the tube plate 4 extends transversely in the containment 2, the tubes 5 together forming a bundle of parallel tubes of vertical axis, these tubes being intended to have flowing internally through them a pressurized primary fluid exchanging heat by way of the wall of these tubes with a secondary fluid circulating on the outside of these tubes in order to be evaporated, the steam produced being collected on the outside of the generator, in particular to ensure by its expansion the driving of a turbine controlling that of an electricity-generating machine.

The tube plate 4 delimits with the spherical dome 3, in the lower part of the generator 1, a region 8, usually called a water box, into which the primary fluid is introduced by means of a feed connection 9 made in the dome 3, the orifice of the latter also making it possible to introduce into the region 8 a work tool diagrammatically as a whole by the reference tool comprising in simplified form a body 11 equipped with a central spindle 12 intended for carrying out a repair or a particular maintenance operation on the lower end 6 of any of the tubes 5 of the bundle or within this tube in its part fixed to the plate 4.

The tool body 11 is carried by a remote-manipulator arm or similar appliance, of which only the end 13 connected to the tool has been indicated, this arm represented by the dot-and-dash line 14 making it possible to execute displacements of the tool 10 in any one of the three spatial directions, particularly according to a rising or falling movement, in order to bring the spindle 12 nearer to or further from any tube 5 in the bundle of tubes of the plate 4 and also to displace this tool from one tube to the other within the region 8. For this purpose, the arm 14 is connected, on the outside of the generator 1, to a control assembly 15 which makes it possible to monitor these movements and position the spindle 12 accurately in the axis of the selected tube 5 or in any other position made necessary by the work to be carried out on this tube.

According to the invention, the body 11 of the tool 10 is directly equipped with optical means and with means for processing the information provided by these means in order to make it possible to bring into coincidence reliably, quickly and accurately the axis of the spindle and that of the tube on which this work is to be carried out.

For this purpose, the body 11 is associated with a supporting frame 16 carrying lighting members 17 (shown schematically in FIG. 3) for illuminating the lower end 6 of the selected tube 5, flush with the face 7 of the plate 4 directed towards the region 8, and optical systems 18 interacting with lighting members 17, in such a way that the image of given points, such as 19, belonging to this end 6 can be transmitted directly by the optical systems to a camera 20, itself providing an image on the screen 21 of a video monitor, representing the corresponding cross-section of the tube in question.

FIGS. 2 and 3 illustrate more specifically the mounting of the supporting frame 16 on the body 11 of the tool 10, this frame preferably taking the form of a horseshoe-shaped element 22 equipped with a fastening bracket 23 comprising blind bores 24 suitable for interacting with locking screws 25 mounted at the end of two positioning right-angle brackets 26 extending parallel to one another and symmetrically on each side of the body 11. As shown on a larger scale in FIG. 3, it can be seen that, as a result of these arrangements, the horseshoe element 22 of the frame 16 can partially surround the body of the tool, while at the same time leaving a circumferential play 27 free relative to the latter, with the lighting means 17 and the optical systems 18 carried by the frame 16 being arranged symmetrically in relation to the vertical axis 28 of the tool, this being achieved without the need to proceed with any dismounting of the spindle, the frame coming into place simply by means of a lateral displacement relative to the body 11.

Figure 4:
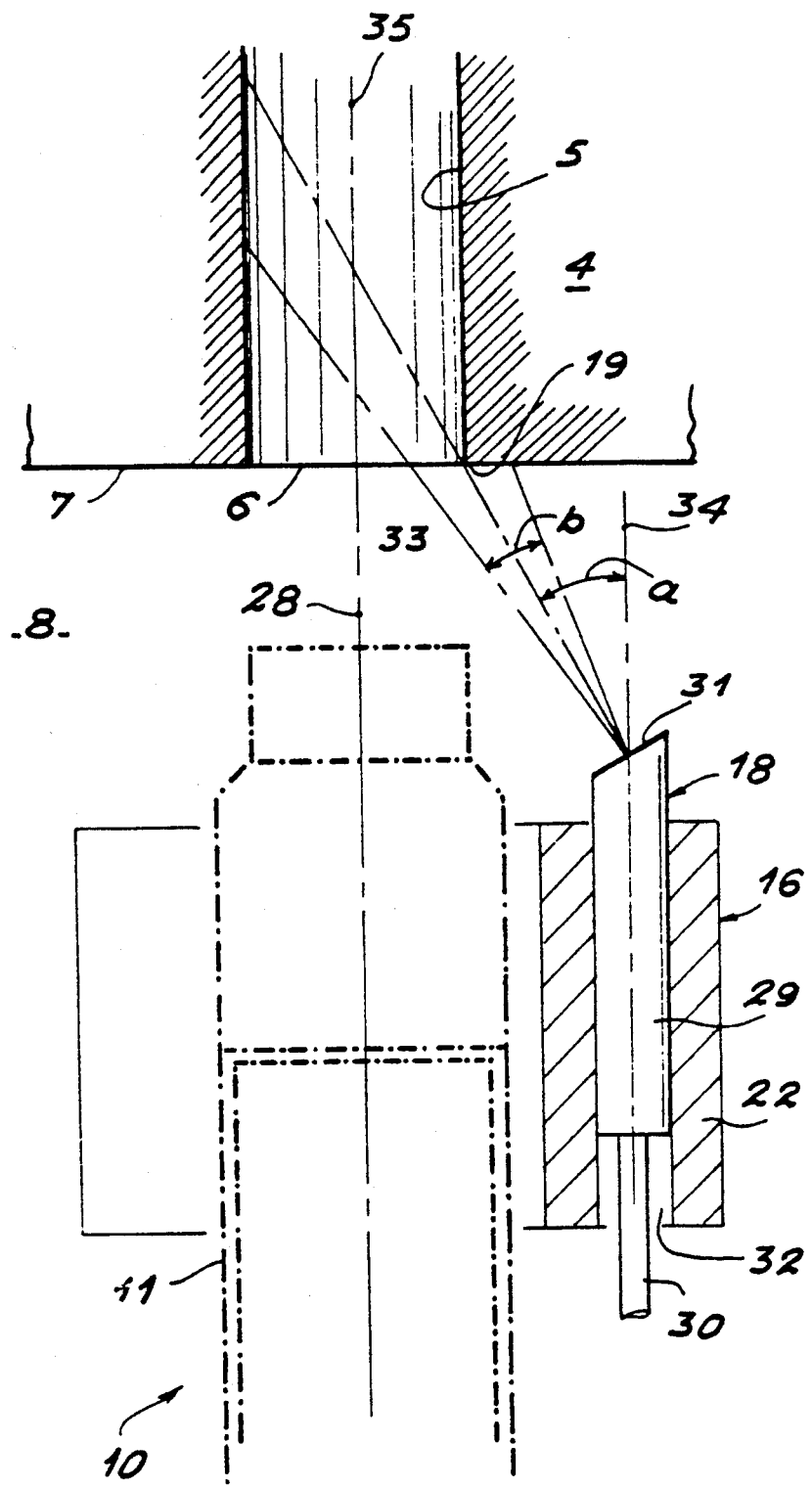
FIG. 4 is a cross-sectional view on a larger scale of the frame and more particularly of one of the optical systems carried by the latter, making it possible to explain more specifically the use of the device in question.

In the exemplary embodiment more particularly under consideration, the frame 16 comprises three lamps or other similar lighting means 17, preferably consisting of halogen lamps capable of supplying a narrow light beam in the direction of the lower end 6 of the tube 5 when the tool 10 is brought suitably near to the plate 4. These three lamps 17 are distributed substantially at 120° relative to one another about the axis 28, each lamp being associated with an optical system 18, which, likewise preferably, consists of the endpiece 29 of an optical fiber 30, as shown more specifically in FIG. 4.

By virtue of construction, each of the three lamps 17 is arranged on the supporting frame 16 in the immediate vicinity of the endpiece 29 of the associated optical system 18, each endpiece having particularly a truncated plane face 31 and being mounted in a suitable receptacle 32 provided in the element 22, in such a way that the perpendicular 33 to the face 31 delimits an angle $\underline{a}$ with the vertical direction 34, the narrow light beam coming from the associated source 17 having an aperture angle $\underline{b}$ about this perpendicular 33.

During operation, the arm of the remote manipulator 14 is controlled in the vertical direction, in such a way that the light beam coming from each source 17 comes tangent with the point 19 of the lower part 6 of the tube 5 at the location where the latter opens onto the face 7 of the plate 4, the aperture $\underline{b}$ of the beam making it possible to obtain an image of this part of the tube representing a fraction of the interior of the latter and, simultaneously, a fraction of the exterior in line with the plate 4.

The images of the points 19, thus corresponding to each of the three lighting lamps 17, picked up by the three optical fibers 30 of the associated optical systems 18, are then combined and transmitted to a single sensor (not shown), preferably of the solid-state charge-transfer sensor type (CCD), of the photographic camera 20 which sends these images to the screen 21 of the video monitor which is arranged outside the generator 1 and from which the user controls the monitoring device 15 ensuring the displacements of the arm of the remote manipulator 14 and consequently of the tool 10.

Figures 5, 6:
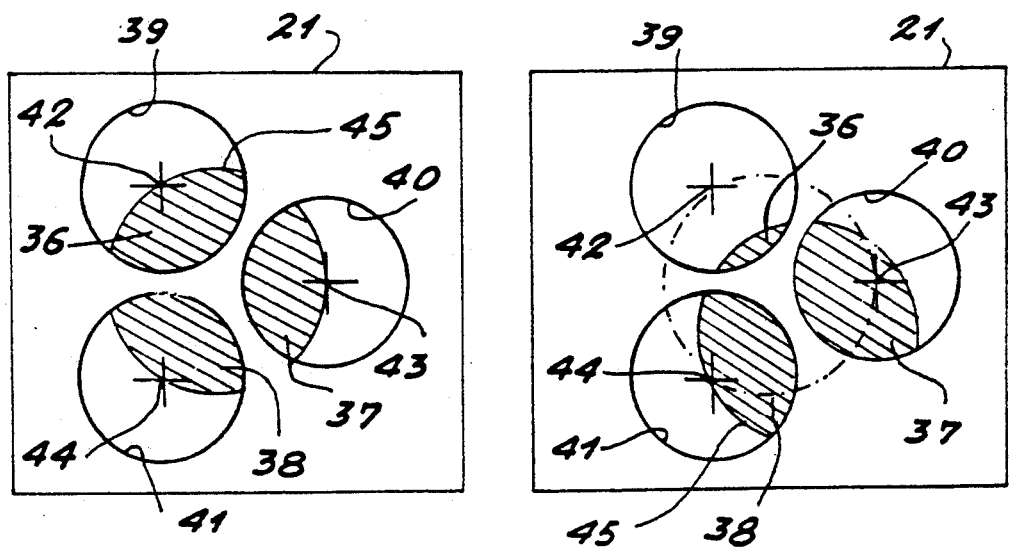
FIGS. 5 and 6 are schematic front views of a video screen associated with the means carried by the supporting frame, showing the tube image obtained respectively before and after centering of the tool in relation to the axis of this tube.

By virtue of the arrangement of the light sources 17 and of the optical systems 18 mounted at 120° about the axis 28 of the tool, therefore, the three images obtained each represent a portion of the tube and of the tube plate in the region adjacent to this with an acceptable magnification compatible with the requisite accuracy. Under these conditions, when the axis 28 of the tool 10 is shifted relative to the axis 35 of the tube 5 in question (FIG. 5), the three partial images of the tube examined are represented by three fractions of a circle 36, 37 and 38, the contours of which are inscribed differently from one another within three identical circles, 39, 40 and 41 centered respectively in three reticles 42, 43 and 44 appearing on the screen 21 and arranged in such a way that they define the contour of the tube 5 examined. In contrast, when the tool is centered perfectly in relation to the tube, i.e., when the axis 28 coincides strictly with the axis 35 (FIG. 6), the three images 36, 37 and 38 are identical and all have a point of intersection with the reticles 42, 43 and 44 of the circles 39, 40 and 41, the image of the end 6 of the tube which corresponds on the screen to the circle 45 passing from then on through these three reticles.

As a result of these arrangements, it will be seen that it is immediately possible to reset the tool on the tube in which work is to be carried out, the operator who is viewing the video screen 21 ensuring, by the control of the device 15, the necessary displacements of the tool suitable for bringing its spindle 12 into the axis of the tube, this resetting corresponding directly on the screen to the centering of the circle 45 on the reticles.

In the foregoing example, the processing of the image of the end of the tube provided by the camera is carried out by an operator. Alternatively, it could be executed by an image-processing system generating positioning error signals proportional to the misalignment of the axes of the tube and of the tool. Likewise, although the example described entails the use of three lighting sources and of three associated optical systems, it would be possible just as easily to conceive of a larger number of such components maintaining a symmetrical arrangement about the axis of the body of the tool.

Likewise preferably, there has been provision for using halogen lamps on the supporting frame carried coaxially by the body of the tool, allowing appreciable lighting of the end of the tube and substantial contrast between the actual tube plate and the inner region of this tube. Other optical systems could, of course, be considered, these providing narrow directional radiation, particularly by laser beams or the like, at all events these lighting members advantageously being associated with means for controlling their extinguishing to prevent them from interfering with the other optical monitoring mean used for checking the correct functioning of the arm of the remote manipulator ensuring the positioning of the tool.

The device according to the invention does not itself have any movable element, thus giving the assurance of good mechanical resistance and an appreciable lifetime. Moreover, its overall size, particularly in terms of height, can be greatly reduced so as not to impede the movements of the arm of the remote manipulator. Finally, the time needed for an operation for centering the tool can be very short, thereby proportionately reducing the duration of the maintenance work to be carried out on the tubes of the steam-generator plate, this operating rapidity being accompanied by excellent reliability, the positioning accuracy being capable of being better than 0.2 mm.

I claim:

1. Process for positioning a tool carried by a manipulating arm capable of being displaced in three respectively perpendicular spatial directions in relation to a vertical axis, especially the vertical axis of a tube carried by a tube plate of a steam generator for a nuclear reactor, said process including the steps of
   (a) arranging symmetrically on said arm a set of at least three lighting sources (17), each providing a light beam directed tangentially towards a periphery of said tube (5);
   (b) retransmitting, by means of an optical assembly (18) likewise carried by said arm, images of three specific points of said tube illuminated by said sources in the direction of a video monitor having a screen (21) comprising three reticles (42, 43, 44) delimiting an actual contour of said tube; and
   (c) bringing these images into coincidence with said reticles in order to center the axis (28) of said tool strictly on said vertical axis (35) of said tube.
2. Process according to claim 1, wherein said three lighting sources are constituted by point lamps, and said optical assemblies are three independent systems, said light beams supplied by said lighting sources, after being reflected on the end of said tube, being received by said optical systems returning said images of three points of said tube illuminated by said lighting sources towards a common camera (20) connected to said video monitor.
3. Process according to claim 2, wherein each lighting source (17) is associated with an optical system (18) located in the vicinity, said three lighting sources and said three optical systems being respectively distributed substantially at 120° about the axis of said tool.
4. Device for positioning a tool carried by a manipulating arm capable of being displaced in three respectively perpendicular spatial directions in relation to a vertical axis, especially the vertical axis of a tube carried by a tube plate of a steam generator for a nuclear reactor, comprising a horseshoe-shaped supporting frame (16) surrounding partially and without direct contact a body (11) of a work tool (10) having a spindle (12) arranged coaxially with a vertical axis (35) of a tube (5), said frame comprising at least three lighting sources (17) arranged substantially at 120° about said spindle and three optical systems (18), each lighting source supplying a narrow light beam directed tangentially onto a periphery of said tube in its end (6) flush with a face of a tube plate (4), in order to provide an image of a point (19) of the latter collected by said optical system associated with each said lighting source, images of the three points being retransmitted to a screen (21) of a video monitor comprising three reticles (42, 43, 44) delimiting an actual contour of said tube, and means for displacing said tool relative to said tube in order to bring said images into coincidence with said reticles so as to enter the axis (28) of said tool on the axis of said tube.
5. Device according to claim 4, wherein each optical system (18) consists of an optical fiber (30), the three systems which correspond to the three lighting sources (17) likewise being distributed substantially at 120° about the axis (28) of said tool and being carried by said supporting frame (16) in the immediate vicinity of each lighting source.
6. Device according to claim 4, wherein the three sources (17) consist of halogen point lamps.
7. Device according to claim 5, wherein the images of the three points (19) of the tube (5), collected separately by the three fibers (30), are returned to a single solid-state sensor, connected to a common camera (20) transmitting said images simultaneously to said screen (21) of said video monitor comprising the three positioning reticles (42, 43, 44).
8. Device according to claim 4, wherein said supporting frame (16) comprises a bracket (23) for fastening to the body (11) of said tool by fastening means (25), making it possible to bring the center of said horseshoe-shaped frame into coincidence with the axis (28) of said tool.
9. Device according to claim 5, wherein the end face (30) of each optical system (18) is arranged in such a way that the perpendicular (33) to said end face delimits a specific angle (a) with the direction of the axis (35) of said tube, the narrow light beam supplied by the associated lighting source (17) having a given aperture angle (b) centered on said perpendicular.

* * * * *

UNITED STATES PATENT AND TRADEMARK OFFICE
CERTIFICATE OF CORRECTION

PATENT NO. : 5,263,059
DATED     : November 16, 1993
INVENTOR(S) : Alain Blocquel It is certified that error appears in the above-identified patent and that said Letters Patent is hereby corrected as shown below:

On the title page, Item [30]: priority document number to read:
--91 14957--.

Signed and Sealed this

Third Day of May, 1994

Attest:

BRUCE LEHMAN

Attesting Officer

Commissioner of Patents and Trademarks